United States Patent [19]

Chang et al.

[11] Patent Number: 4,670,412

[45] Date of Patent: Jun. 2, 1987

[54] MODIFICATION OF CRYSTALLINE MICROPOROUS ZEOLITES

[75] Inventors: Clarence D. Chang, Princeton; Cynthia T. W. Chu, Pennington; Joseph N. Miale, Lawrenceville, all of N.J.

[73] Assignee: Mobil Oil Corporation, New York, N.Y.

[21] Appl. No.: 755,252

[22] Filed: Jul. 15, 1985

[51] Int. Cl.[4] ......................... B01J 29/08; B01J 29/28

[52] U.S. Cl. ........................................ 502/77; 502/60; 502/71

[58] Field of Search .............................. 502/60, 71, 77

[56] References Cited

U.S. PATENT DOCUMENTS

| | | | |
|---|---|---|---|
| 2,413,134 | 12/1946 | Barrer | 502/60 |
| 3,181,231 | 5/1965 | Breck | 502/74 X |
| 3,200,082 | 8/1965 | Breck et al. | 502/74 |
| 3,644,220 | 2/1972 | Kearby | 502/60 X |
| 3,674,709 | 7/1972 | Barrer et al. | 502/60 X |
| 4,576,805 | 3/1986 | Chang et al. | 423/328 X |

*Primary Examiner*—Carl F. Dees

*Attorney, Agent, or Firm*—A. J. McKillop; M. G. Gilman; L. P. Hobbes

[57] ABSTRACT

Natural and synthetic micorporous crystalline minerals that have a robust three-dimensional framework are modified by treatment with a molten salt that contains a component that reacts with the framework. Highly siliceous ZSM-5 and some aluminum phosphate compositions are catalytically activated by this method.

8 Claims, No Drawings

MODIFICATION OF CRYSTALLINE MICROPOROUS ZEOLITES

FIELD OF THE INVENTION

This invention is concerned with natural and synthetic inorganic, porous crystalline minerals that have a robust three-dimensional framework. In particular, it is concerned with a method for modifying the framework composition of such minerals so as to enhance catalytic activity, catalytic selectivity, or both.

BACKGROUND OF THE INVENTION AND PRIOR ART

The term "mineral" as used herein means a natural or a synthetic inorganic solid that is insoluble in water and that has a high melting point. The porous crystalline minerals referred to herein melt at temperatures usually in excess of 750° C., and some retain their porosity and crystallinity even after calcination at 1000° C.

The crystalline minerals referred to herein have highly ordered, robust three-dimensional framework structures as evidenced by well-defined and reproducible X-ray diffraction patterns which are distinctive for the different framework structures. The ordered structures contain intracrystalline micropores, i.e. pores of molecular dimensions, regularly disposed in the crystal lattice and readily distinguishable from the much large extracrystalline pores formed by agglomerates of microcrystals. Because of their intracrystalline nature, these pores are very uniform and, when free of occluded matter, selectively sorb only those molecules having a critical diameter that can be accomodated by the pore size of the particular mineral in question. Such microporous minerals are often referred to as "molecular sieves". The terms "pores" and "porous", as used herein, refers to the intracrystalline micropores unless explicitely stated to be otherwise.

The three-dimensional frameworks of the crystalline microporous minerals useful herein are formed by one or more tetrahedrally bonded elements linked together by covalent bonds to oxygen atoms. Such structures are found in nature as aluminosilicate deposits such as erionite and mordenite. These naturally-occurring robust structures are not electoneutral because of the tetrahedrally incorporated trivalent aluminum, and as a result the structures must be associated with hydrogen cations and/or metallic cations. These cations are contained in the micropores of the crystal, and usually may be ion exchanged with other cations. For purposes of the present invention, the term "framework" as used herein is intended to refer only to the tetrahedrally bonded element or elements together with the associated oxygen of the robust framework, and to exclude the mobile cations that may be present. For a more detailed description of such microporous minerals, the reader is referred to "Zeolite Molecular Sieves" by D. W. Breck, Wiley, N.Y., 1974, the content of which is incorporated by reference for background.

The art of mineralizing inorganic gels to produce synthetic microporous crystalline minerals of the type described herein has advanced considerably in recent years. The earliest developments provided not only counterparts of naturally occurring aluminosilicate minerals such as faujasite, but also of aluminosilicate minerals not found in nature, such as Linde Zeolite A. In general, the frameworks of these early synthetics and of the naturally occurring zeolites were relatively rich in alumina, having a silica to alumina molar ratio not greater than about 10. Later developments, involving the inclusion of organic templating agents in the mineralizing compositions, led to minerals having no natural counterparts and framework compositions very rich in silica, as well as framework compositions in which the tetrahedrally bonded elements are aluminum and phosphorous, i.e. having no silicon at all. In addition, such structures have been synthesized which contain gallium, iron, and boron as a tetrahedrally bonded element. The descriptive phase "microporous crystalline mineral" as used herein is intended to mean a natural or synthetic mineral having a robust three-dimensional structure of the type described above and associated cations, if any are present, regardless of the indentity of the tetrahedrally bonded elements unless these are explicitely specified. Furthermore, for purposes of clarity and concise expression, any reference made herein in the disclosure and in the claims to the "framework composition" is intended to refer to the tetrahedrally bonded elements of the framework.

Certain microporous crystalline minerals have found extensive use as catalysts in the processing of petroleum, in the production of petrochemicals, and to a lesser extent in the chemical industry. Catalytic cracking, hydrocracking, catalytic dewaxing, alkylation, dealkylation, transalkylation, isomerization, polymerization, additions, disproportionation, conversion of methanol to hydrocarbons, and other acid catalyzed reactions may be performed with the aid of such catalysts.

It has long been known that the content of mobile cations in a microporous crystalline mineral is that which stoichiometrically balances the electrostatic charge of the framework composition, and in general the cation composition itself may be reversibly changed by ion-exchange. The composition of the robust framework, once formed, however is not so readily altered. Very recently issued patents, such as U.S. Pat. No. 4,513,091 to Chang et al. describes a hydrothermal method for introducing tetrahedrally bound aluminum into the structure of a high silica content crystalline zeolite having a silica to alumina ratio of at least 70:1 and a Constraint Index of 1 to 12. U.S. patent application Ser. No. 493,192 filed May 13, 1983 now U.S. Pat. No. 4,576,805 describes a method for enhancing the catalytic activity of a zeolite by contact at high temperature with a volatile compound to be coordinated in the framework of the zeolite.

The use of molten salt to occlude the salt in a crystalline zeolite has been described by Barrer and Meier, *J. Chem. Soc.*, p. 299 (1958). However, there appears to be no description of the use of a molten salt medium to alter the framework composition of a preformed microporous crystalline mineral.

It is an object of this invention to provide a facile method for altering the composition of the robust framework of a microporous crystalline mineral. It is a further object of this invention to provide a method for altering the catalytic behavior of a microporous crystalline mineral. It is another object of this invention to provide a novel method for increasing the acid catalytic activity of a microporous crystalline mineral having a substantially electroneutral framework. These and other objects of this invention will become evident on reading this entire specification, including the appended claims.

BRIEF SUMMARY OF THE INVENTION

It has now been found that the framework composition of an inorganic, microporous crystalline mineral having pores sufficiently large to sorb normal hexane may be beneficially modified by reaction with molten salt medium that contains a component having a radius ratio of less than about 0.6, as more fully described hereinunder. The reaction is preferably conducted with sufficient excess of molten salt medium so as to provide a continuous liquid phase. With proper selection of the molten salt composition, as more fully described hereinbelow, the modified mineral produced by the method of this invention has enhanced catalytic activity, enhanced selectivity, or both.

DETAILED DESCRIPTION AND PREFERRED EMBODIMENTS

The method of this invention consists essentially of contacting the porous microcrystalline mineral with a molten salt medium containing at least one component capable of reacting with the framework of the mineral and thereby altering the framework composition, and thereafter removing excess salt medium to recover the modified microporous mineral. A preferred method of contacting is to disperse the mineral in sufficient molten salt to form a fluid mixture, and to maintain this fluid dispersion at a temperature of −50° C. to 1000° C., preferably from about 25° C. to 550° C., for from about 0.2 to 20 hours to effect the desired modification. It is contemplated to use a lesser amount of molten salt effectively, such as enough to fill the pores and provide some extracrystalline liquid without forming a fluid mixture, but the preferred method facilitates heat transfer and temperature control. Removal of the excess salt may be done by extraction with water or other solvent, by sedimentation, by filtration, or by combinations of these means. In one embodiment, the porous mineral to be modified is first formed into pellets or extruded with binder, which facilitates handling to remove excess salt.

It is contemplated to beneficially modify by the method of this invention any porous microcrystalline mineral that has a pore size sufficiently large to sorb normal hexane, and preferably sufficiently large to sorb cyclohexane, i.e. a pore size of at least 6A, since such size is required for catalytic conversion such a catalytic cracking and the other conversions noted above. For purposes of the present invention a mineral will be considered to satisfy the norma hexane sorption requirement if it sorbs at 23° C. at least about 2 wt % at a pressure of 45 Torr. Contemplated improvements in catalytic properties of the products produced by this invention include any of the following; increased activity, improved aging, increased selectivity, and increased stability to steam, as well as combinations of these.

The reactive component for use herein will exhibit a radius ratio of less than about 0.6, preferably from greater than about 0.1 to less than about 0.6. The term "radius ratio" is defined by L. Pauling in *The Nature of the Chemical Bond,* Third Edition, Cornell University Press, 1960, Chapter 13, pages 505 et seq, incorporated herein by reference as to definition of radius ratio, which is as follows:

-continued $$\text{Radius Ratio} = \frac{\text{crystal ionic radius of the central atom of the component}}{\text{crystal ionic radius of the oxygen anion, } O^{-2}}$$

The crystal ionic radii of elements are listed in the *CRC Handbook of Chemistry and Physics,* 61st Edition, CRC Press, Inc., 1980, pp. F-216 and F-217, which listing is incorporated herein by reference. In determining the radius ratio of a particular component, it is necessary to use crystal ionic radii of the central atom therein (e.g. aluminum in aluminum chloride) and the oxygen anion (e.g. $O^{-2}$) which have been measured by the same method. Non-limiting examples of inorganic halides satisfying the radius ratio limitation along with their radius ratio in parenthesis include the following:

$AlBr_3$ (0.386)
$AlCl_3$ (0.386)
$BCl_3$ (0.174)
$FeCl_3$ (0.485)
$CrO_2Cl_2$ (0.394)
$PCl_3$ (0.333)
$TiCl_4$ (0.515)
$SnCl_4$ (0.538)
$GaCl_3$ (0.470)

Inorganic compounds not useful in the present method since their radius ratios fail to satisfy the radius ratio limitation include, for example, $UF_6$ (0.606), $SnCl_2$ (0.704), $CrCl_2$ (0.674), $TiCl_2$ (0.712), $SrCl_2$ (0.848) and $CeCl_3$ (0.783).

The preferred component having a radius ratio of less than about 0.6, for purposes of the present invention, is one which has a central atom selected from the group consisting of $Al^{+3}$, $B^{+3}$, $Be^{+2}$, $Co^{+2}$, $Cr^{+6}$, $Fe^{+3}$, $Ga^{+3}$, $Ta^{+5}$, $Mn^{+4}$, $Mo^{+6}$, $P^{30}$ 3, $Sb^{+3}$, $Si^{+4}$, $Sn^{+4}$, $Ti^{30}$ 4, $V^{+5}$, $W^{+6}$, and $Zr^{30}$ 4.

The molten salts that are useful for the purposes of this invention broadly are those with a component having a radius ratio of less than about 0.6 and a melting point in the range of about −70° C. to about 950° and preferably in the range of 20° C. to 500° C. Salts that may be used include simple salts such as $AlBr_3$ which melts at 97.5° C. However, eutectic salt mixtures also may be used advantageously for any of several reasons. In some instances a particular salt may sublime at atmospheric pressure and at a temperature lower than its melting point, in which case a eutectic of the salt can provide the required melt. In the case of a salt that melts at a temperature well in excess of 550° C. a eutectic may provide a satisfactory melt in the preferred temperature range. A eutectic mixture may contain more than one component having a radius ratio of less than about 0.6, and such eutectics are contemplated as within the scope of this invention. An extensive list of eutectic compositions is given in *Fused Salt Mixtures, Eutectic Compositions and Melting Points,* by Paul V. Clark, published by Sandia Corporation, Albuquerque, New Mexico, Dec. 30, 1963, the entire content of which is incorporated herein by reference with particular attention called to the list on pp 253–419, arranged by melting point. Table 1 presents a small sample of the eutectics listed by Clark which have one, or in some instances two components that have a radius ratio of less than about 0.6.

TABLE

| (A) | (B) | mol % A | M.P., °C. |
|---|---|---|---|
| $FeCl_3$ | NaCl | 54 | 158 |
| $GaCl_3$ | KCl | 49 | 210 |
| $ZnCl_2$ | $ZnSO_4$ | 90 | 300 |

TABLE-continued

| (A) | (B) | mol % A | M.P., °C. |
|---|---|---|---|
| $CrCl_3$ | NaCl | 33.5 | 537 |
| KCl | $ZrCl_4$ | 42.2 | 220 |
| $K_2SO_4$ | $V_2O_5$ | 63 | 430 |
| $POCl_3$ | $SiCl_4$ | 4 | −71.8 |
| $SiCl_4$ | $WCl_6$ | (almost) 100 | −70 |
| $Si_2OCl_6$ | $TiCl_4$ | 42 | −50 |

While it is contemplated to use the method of this invention to advantageously modify any natural or synthetic microporous crystalline mineral characterized by pores that sorb normal hexane, such as the aluminosilicate zeolites, Zeolite X, Zeolite Y, erionite, mordenite, Zeolite Beta, and others, the method is also useful for the class of synthetic highly siliceous zeolites, sometimes referred to as the ZSM-5 type zeolites, that is characterized by having pore windows formed of ten-membered rings of oxygen. This type will now be described in detail.

The ZSM-5 type minerals are members of a novel class of zeolites that exhibit unusual properties. These zeolites have unusually low alumina contents, i.e. high silica to alumina ratios of at least 12, and they have an intracrystalline sorption capacity for normal hexane which is greater than that for water, i.e. they exhibit "hydrophobic" properties.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the robust anionic framework of the zeolite crystal and to exclude aluminum in the binder or in cationic or other form within the channels.

The ZSM-5 type zeolites referred to herein have an effective pore size such as to freely sorb normal hexane. In additon, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of mineral (in the hydrogen form) at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log \text{(fraction of n-hexane remaining)}}{\log \text{(fraction of 3-methylpentane remaining)}}$$

The Constraint Index approximates the ratio of the cracking rate constants for the two hydrocarbons. Zeolites of the ZSM-5 type have a Constraint Index of 1 to 12. C.I. values for some typical zeolites are:

TABLE 2

| CAS | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H—Zeolon (mordenite) | 0.4 |
| REY | 0.4 |
| Amorphous Silica-Alumina | 0.6 |
| Erionite | 38 |

The above-described Constraint Index is an important definition of those zeolites which are useful in the instant invention. The very nature of this parameter and the recited technique by which it is determined, however, admit of the possibility that a given zeolite can be tested under somewhat different conditions and thereby have different Constraint Indices. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the definition regardless that the same identical zeolite tested under other defined conditions may give a Constraint Index value outside of 1 to 12.

For ZSM-5 type zeolites of very high silicon to aluminum ratio, such as 26,000:1, the Constraint Index cannot be measured reliably because of the very low activity of the zeolite. In such cases reliance on the substantial identity of the X-ray pattern to that of a less siliceous counterpart is useful. Many such zeolites, after activation by the method of this invention, become active enough to make direct Constrain Index evaluation feasible.

The class of highly siliceous zeolites defined herein is exemplified by ZSM-5, ZSM-11, ZSM-12, ZSM-21, ZSM-23, ZSM-35, ZSM-38, ZSM 48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particulary described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic species from the forming solution. These organic templates are removed by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space.

In a preferred embodiment, the method of this invention is used to increase the acid catalytic activity of synthetic microporous crystalline minerals that sorb normal hexane and that are further characterized by a substantially electroneutral robust framework. Such minerals are known and posess various advantageous catalytic properties, but in general they tend to be characterized by low catalytic activity for acid catalyzed reactions. The term "substantially electroneutral" is used herein to mean that the mineral has an ion-exchange capacity of less than about 0.05 meq/g (milliequivalents per gram of mineral). In the case of an aluminosilicate mineral, an exchange capacity of 0.05 meq/g corresponds to a framework structure in which the silica to alumina ratio is about 500 to 1.0.

One subgroup of mineral characterized by a substantially electroneutral framework is that in which almost all of the tetrahedrally coordinated framework element is silicon. Members of the above-described ZSM-5 type crystal structures may be prepared with extremely high silica to alumina ratios such as 13,000 to 1.0, for example, as described in U.S. Pat. No. Re. 29,948 to Dwyer et al. and in U.S. patent application Ser. No. 003,146 filed Jan. 15, 1979. Such minerals have substantially the same X-ray diffraction pattern as their less siliceous counterparts and they also possess a Constraint Index of 1 to 12.

A second subgroup of mineral characterized by a substantially electroneutral framework is that in which the framework elements are aluminum and phosphorous. These are described in U.S. Pat. No. 4,310,440 to Wilson et al., which is incorporated herein by reference. Included in said description are the X-ray diffraction patterns and other properties of $AlPO_4$-5, $AlPO_4$-8, $AlPO_4$-9 and other crystal structures designated as $AlPO_4$-11, -12, -14, -16, -17, -18, -20, -21, -22, -23, -25, -26, -28 and -31. Some of these structures, such as $AlPO_4$-28, do not sorb more than 2 wt % of normal hexane and are not useful for purposes of the present invention. Structures which appear to sorb more than about 2 wt % normal hexane include $AlPO_4$-5, -8, -11, -16, -17, -18 and -31.

Other structures that may be modified by the method of this invention include those minerals described in U.S. Pat. No. 4,440,871 to Lok et al. which satisfy the structural and n-hexane sorp ion limitations described above. It is contemplated also to modify sepiolite by the method of this invention.

It is useful at this point to illustrate this invention by example, which is not to be construed however as limiting the scope thereof, said scope being determined by this entire specification including the appended claims.

EXAMPLE

To an equimolar mixture of anhydrous $AlCl_3$ (4.6g) and NaCl (2g) was added 1.8 g of 14/30 mesh high silica ZSM-5 ($Si/Al_2=26,000$). The mixture was heated to 140° C., where a clear liquid phase containing the suspended zeolite formed. After 3 hours, the mixture was cooled and extracted with $CCl_4$ to remove $AlCl_3$, and then water-washed to remove NaCl. The zeolite was exchanged with 1N $NHNo_3$, washed, dried at 130° C., and calcined. The catalyst was tested for n-hexane cracking at 538° C., with the following results.

| | alpha value |
|---|---|
| Parent ZSM-5 | 0.015 |
| Activated ZSM-5 | 5 |

The modified minerals prepared by the method of this invention are particularly useful as catalysts for acidcatalyzed hydrocarbon conversion reactions.

The term "acid catalytic activity" as used herein refers to the effectiveness of the mineral, when in suitable form, for catalyzing reactions known to be promoted by socalled acid catalysts. Catalytic cracking, hydrocracking, skeletal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value =1 means that the test sample and the reference standard have about the same activity. The alpha test is described in U.S. Pat. No. 3,354,078 and in The Journal of Catalysis, Vol. IV, pp. 522–529 (August 1965), both of which are incorporated herein by reference. Measurement of the "alpha value" is useful to assess the extent of catalyst activity before treatment, and also the degree of activation achieved with any sample treated by the method of this invention. For this purpose, the zeolite is converted to the hydrogen form before evaluation. However, other conversions also may be used to assess catalytic activity.

The method of this invention may be used to effect insertion of aluminum or otherwise alter the robust framework of the zeolite, without substantial change of the crystal structure. When aluminum is inserted into a ZSM-5, for example, the increased ion-exchange capacity of the product may be measured by ordinary ion-exchange techniques, or by temperature programmed desorption of ammonia. The ammonia desorption/TGA technique is described in a publication by G. T. Kerr in Thermochemica Acta, Vol. 3, p. 113, (1971), the contents of which are incorporated herein by reference.

The products produced by this invention often are at least partially in the alkali or other metal form. They may be converted to the hydrogen or to any other form suitable for a particular application by methods known to those skilled in the art, and they may be composited with a hydrogenation component if such is required for the application.

The crystalline materials prepared by the present method are useful as catalyst components for a variety of organic compound conversion processes. Such processes include, as non-limiting examples, cracking hydro- carbons with reaction conditions including a temperature of from about 300 ° C. to about 700° C., a pressure of from about 0.1 atmosphere to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmospher to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atomospheres, a weight hourly space velocity of from about 0.5 to about 400 and a hydrogen/hydrocarbon mole ratio of from about 0 to about 20; converting olefins to aromatics, e.g. benzene, toluene and zylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or etheres, e.g. dimethylether, or mixtures thereof to hydrocarbons including aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmoshperes and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and aclohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

What is claimed is:

1. A method for modifying the framework composition of a highly siliceous zeolite having a silica to alumina ratio greater than about 500, said method comprising preparing a mixture of said zeolite and a molten salt medium containing a component having a radius ratio of less than about 0.6, said molten salt medium being present in an amount sufficient to fill said pores, maintaining said mixture for about 0.2 to 20 hours at a temperature in the range of −50° C. to 1000° C. and above the melting point of said salt whereby reacting said zeolite with said component, therafter removing said medium whereby recovering said crystalline modified zeolite.

2. The method of claim 1 wherein said component having a radius ratio of less than about 0.6 has a central atom selected from the group consisting of $Al^{+3}$, $B^{+3}$, $Be^{+2}$, $Co^{+2}$, $Cr^{+6}$, $Fe^{+3}$, $Ga^{+3}$, $Ta^{+5}$, $Mn^{+4}$, $Mo^{+6}$, $P^{+3}$, $Sb^{+3}$, $Si^{+4}$, $Sn^{+4}$, $Ti^{+4}$, $V^{+5}$, $W^{+6}$ and $Zr^{+4}$.

3. The method described in claim 2 wherein said framework composition is substantially electroneutral.

4. The method described in claim 3 wehrein 99.5 mol % of said tetrahedrally bonded framework element of said zeolite is silicon and said modified zeolite has enhanced activity for acid-catalyzed reactions.

5. The method described in claim 4 wherein said zeolite is ZSM-5.

6. The method described in claim 5 wherein said molten salt is an equimolar mixture of anhydrous aluminium chloride and sodium chloride.

7. The method described in claim 2 wherein said zeolite is selected from the group consisting of ZSM-5, ZSM-11, ZSM-12, ZSM-21, ZSM-23, ZSM-35, ZSM-38 and ZSM-48.

8. The products prepared by the method of claim 1.

* * * * *